United States Patent [19]

Minkler

[11] 4,392,411
[45] Jul. 12, 1983

[54] LAUNCH FOR CARRYING AND LAUNCHING FLYING BODIES, IN PARTICULAR FOR AIRCRAFT

[75] Inventor: Bernd Minkler, Oberteuringen, Fed. Rep. of Germany

[73] Assignee: Dornier GmbH, Fed. Rep. of Germany

[21] Appl. No.: 249,618

[22] Filed: Mar. 31, 1981

[51] Int. Cl.³ .............................................. F41F 7/00
[52] U.S. Cl. ................... 89/1.819; 89/1.806; 244/63
[58] Field of Search ............... 89/1.819, 1.806, 1.8, 89/1.815, 1.5 R, 1.5 G; 244/63

[56] References Cited

U.S. PATENT DOCUMENTS

| | | | |
|---|---|---|---|
| 3,040,629 | 6/1962 | Duncan et al. | 89/1.819 X |
| 3,115,059 | 12/1963 | Moul | 89/1.819 |
| 3,153,980 | 10/1964 | Kongelbeck | 89/1.819 |
| 3,195,406 | 7/1965 | Toomey | 89/1.819 |
| 3,437,291 | 4/1969 | Bochman | 244/63 |
| 3,771,416 | 11/1973 | Ackerman et al. | 89/1.819 X |
| 3,967,529 | 7/1976 | Ingle et al. | 89/1.819 |
| 4,155,286 | 5/1979 | Mihm | 89/1.819 |

Primary Examiner—David H. Brown
Attorney, Agent, or Firm—James E. Bryan

[57] ABSTRACT

This invention relates to an improvement in a launch for carrying and launching flying bodies, in particular for aircraft, with guide devices in the form of guide rails and guide claws engaging said rails and bearing the flying body,
 the improvement comprising
 (a) means whereby the guide claws can be adjusted together with the flying body relative to the aircraft-fixed launch in the direction of flight within the guide rails and also relative to the flying body they carry in the direction of the flying body tail,
 (b) detachable, positive connection means and frictional connection means between the guide claws and the flying body, and
 (c) braking means for the guide claws at the launch.

5 Claims, 6 Drawing Figures

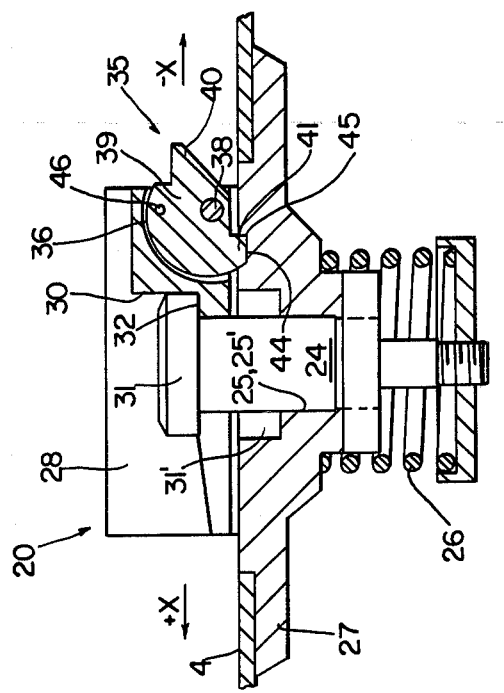
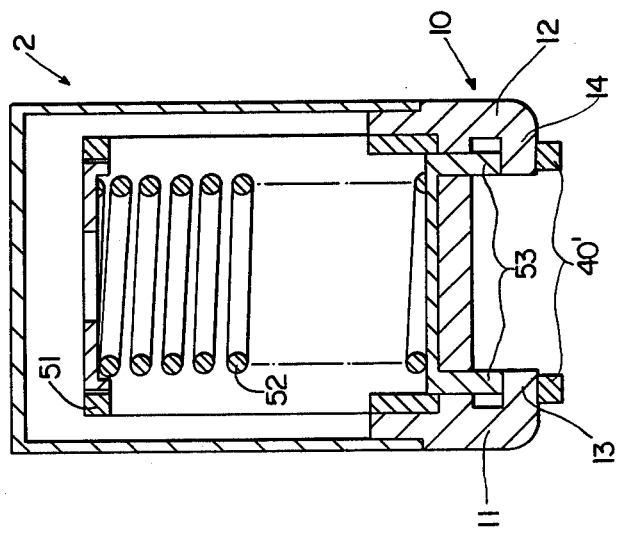
FIG. 6
FIG. 5

LAUNCH FOR CARRYING AND LAUNCHING FLYING BODIES, IN PARTICULAR FOR AIRCRAFT

This invention relates to a launch for carrying and launching flying bodies, in particular for aircraft, with guide devices in the form of guide rails and guide claws, bearing the flying body, which engage the rails.

Launches of the cited kind are designed in such a manner that the guidance of the flying body ensures, by the intermediary of the guide rail and the guide claws engaging the latter, a satisfactory guidance, or alignment, for instance, of target seekers, in the launch over the period of time from the ignition of the aircraft engine to the takeoff of the aircraft from the launch. The associated unlocking system then implements the separation of the flying body from the aircraft, this unlocking system being composed of parts which are provided both on the flying body and on the launch.

As regards known equipment of the cited kind, the guide claws engaging the guide rails remain on the flying body also after launch. Such a design results, however, in difficulties affecting the weight of the flying body, the air drag, which is caused by the claws or parts thereof in the air stream, and the space required where the claws are sunk into the flying body.

It is the object of the present invention to provide a launch which is without mounting or guide parts projecting into the air flow on its outside profile with a view to satisfactory, low-drag flow conditions. It is furthermore an object of the invention to reduce the weight of the flying body by using a special design of the fastening or guide parts.

This problem is solved by the invention in that (a) the guide claws are adjustable relative to the aircraft-fixed launch in the direction of flight together with the flying body when in the guide rails, and also with respect to the flying body in the direction of the flying body tail, (b) a detachable, positive connection as well as a frictional connection is established between the guide claws and the flying body, and (c) a braking system is provided for the guide claws at the launch.

A launch so designed precludes that the flying body will carry along parts of the fastening and guide system not required for its mission. Moreover, following ignition of the flying body engine, the entire launch functions in the absence of a control otherwise requiring an operator, by utilizing the engine thrust.

Another feature of the invention is a further development of its main concept in that a spring-loaded center bolt, after the separation of the claw, automatically moves into a seating space in the flying body flush with the contour thereof. This design achieves that the central bolts will not project into the air stream, with only an extremely modest expenditure in components being required to move them into spaces in the flying body structure.

Another feature of the invention is that the braking system provides braking rails acting on the guide claws with a predetermined compression. This arrangement provides at little cost for the braking of all claws in the forward part of the launch with respect thereto, where the motion with respect to the launch approaches null.

The invention will be further illustrated by reference to the accompanying drawings, in which:

FIG. 5 is a cross-section of the launch along line V—V of FIG. 2; and

FIG. 6 is a cut-out from FIG. 2, showing a locking means detail.

Figure 1:
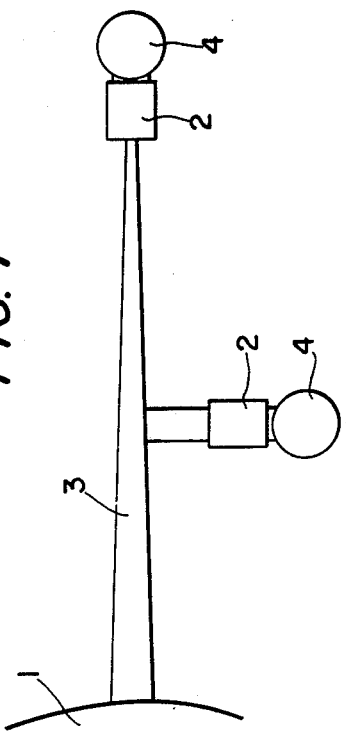
FIG. 1 is a schematic view of a carrier aircraft with a launch and a flying body, in a front view.

As shown by FIG. 1, the launch 2 may be mounted, for instance, at the ends or alternatively below the flight wings 3 of the center aircraft 1; it serves to seat the overall flying body denoted by 4.

As shown by FIGS. 2 through 6, guides or holding devices and corresponding locking systems are provided to fasten the flying body 4 to the launch 2 during the borne flight to the site of operations and for the guidance of the flying body during its launch phase. To that end, a guide rail 10 is connected with the launch 2; the rail 10 extends in the longitudinal aircraft axis over most of the length of the launch. The guide rail 10 comprises two mutually parallel sidewalls 11 and 12 which are provided at their ends with longitudinal projections 13 and 14 pointing at each other. The longitudinal projections 13 and 14 on their insides form the guide surfaces 15 and 16 to seat the guide claws 20 receiving, in a manner to be described further below in greater detail, the flying body 4. Three guide claws 20 are provided to seat and guide the flying body 4 at the launch 2; these three claws are distributed over the length of the flying body. To fasten or to guide the flying body 4, the guide claws 20 are equipped with projections 21 and 22 which point away from each other and which by their surfaces 15' and 16' rest on the surfaces 15 and 16 of the guide rails 10. The guide claws 20 receive their lateral guidance from the parallel sidewalls 11' and 12' of the guide rail 10. The positive locking between each of the claws 20 and the flying body 4 is implemented by a center bolt 24 which by its shank 25 passes through a corresponding bore 25' in the reinforced wall structure 27 of the flying body 4 and which by means of a prestressed compression spring 26 forces the claw 20 against the structure 27 of the flying body. The guide claws 20 rest on the outer surface 23' of the flying body structure 27 by means of their surfaces 23.

As shown in FIG. 6, a recess 28 is fashioned into the claw 20 and extends in the direction of the guide rail 10, open in the direction of flight +X of the flying body but closed in the opposite direction −X, whereby a resting surface 30 is provided. The center bolt 24 includes a head 31 at its upper and fitting into the clearance 31' of the flying body structure 27. The center bolt 24 is made to temporarily rest on a projection 32 in the recess 28 of the claw 20, in a manner discussed further below.

Figure 2:
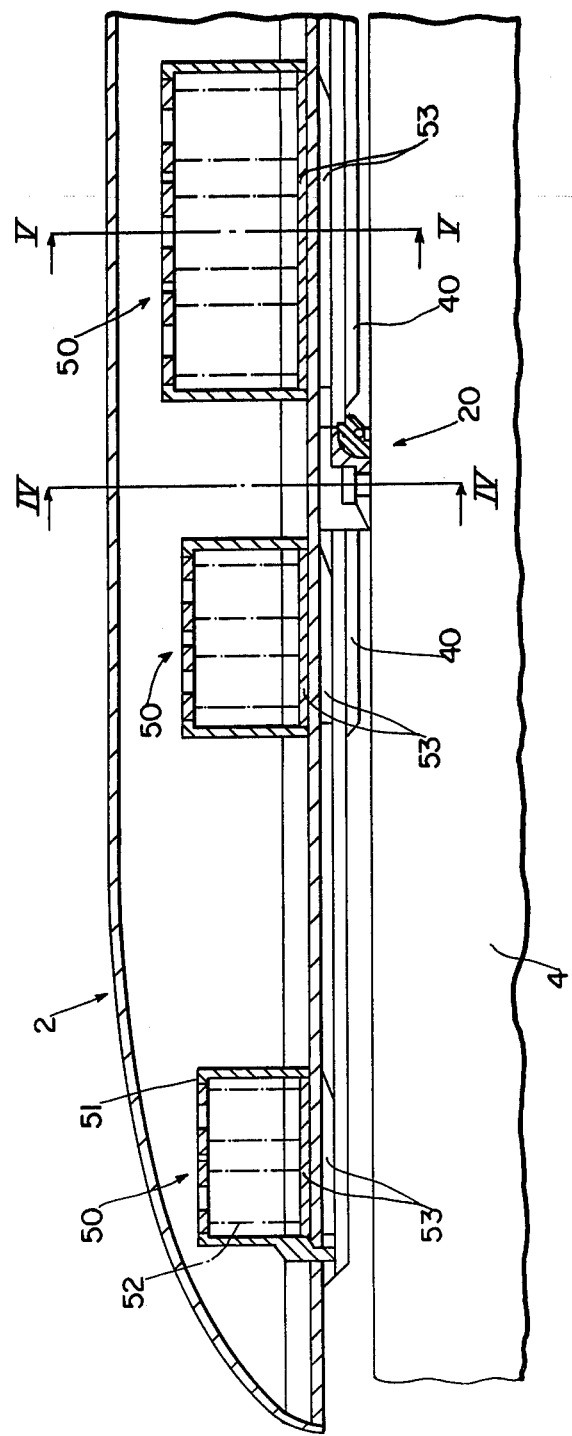
FIG. 2 is a schematic side view of the front segment of the launch and of the flying body, partially in a longitudinal section.
Figure 4:
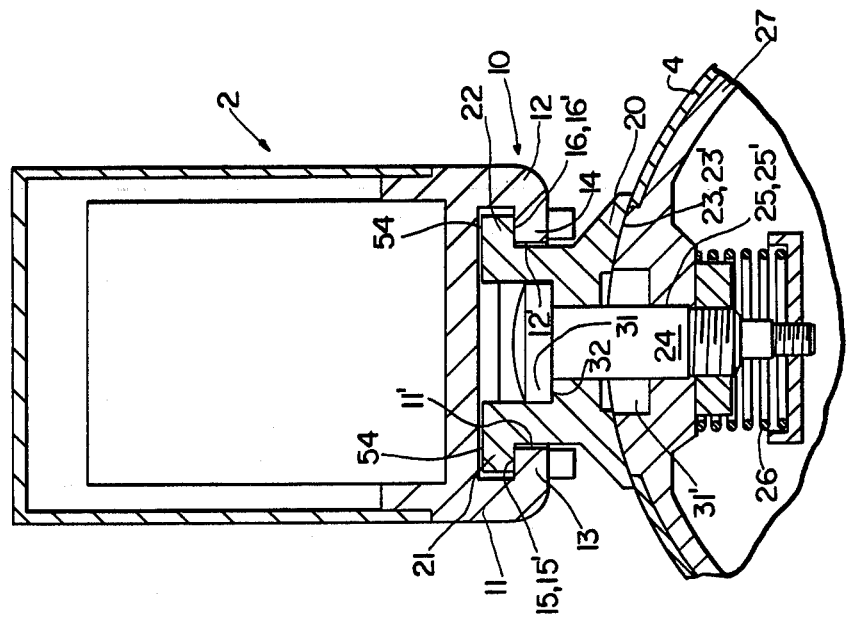
FIG. 4 is a cross-section of the launch along line IV—IV of FIG. 2.
Figure 3:
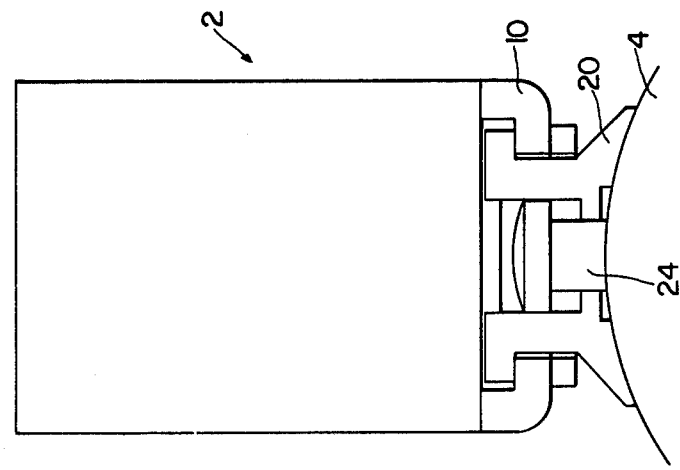
FIG. 3 is a front view of the flying body and the launch.

The claws moreover each have one locking system 35 to lock onto the flying body 4. A cam 39 is set, to that end, into a slot 36 of the claw 20; this cam is spring loaded, rotates about an axis 38, and includes a switching detent and blocking detent 40 and 41 respectively. The blocking detent 41 serves to engage a recess 44 in the flying body structure to form a resting surface 45, whereby the claw 20 can be stopped in the −X direction, that is toward the flying body tail, by means of blocking detent 41. The cam 39 is secured by a shear pin 46 in its locked position. Switch projections 40' are provided on both sides of the guide rail 10, and when the claw 20 moves, the laterally projecting switch detent 40 will run onto these projections, the cam 39 being rotated about its axis, while the pin 46 is sheared off, and the cam being kept in its release position by a torsion spring (omitted). As shown in FIG. 2, braking means 50 are mounted to the launch 2 to brake the guide claws 20 running in the guide rail 10. These means 50 are each composed of a housing 51 fixed to the launch 2, a compression spring 52 resting against the housing and a double braking rail 53 which, by means of the spring 52 under the effect of a predetermined compression, rests against the braking surface 54 (FIG. 4) of the guide claws 20.

The illustrative embodiment functions as follows:

After the engine ignition of the flying body 4, the engine thrust acts by means of the center bolt 24 in one of the guide claws 20 on a central flying body locking device—not further described herein—at the launch 2. Due to the thrust from the flying body engine, the flying body locking device is unlocked and the flying body 4 performs a relative motion together with the guide claws inside the guide rail 10, common to all guide claws, with respect to the launch 2 in the direction of flight +X of the flying body. After covering a predetermined relative path by the flying body 4 with respect to the launch 2, the claw locking system 35 of the guide claws 20 is unlocked by the switch surface of the switch detent 40 moving onto the mating surface at the switch projections 40'—which are fixed to the guide rail—by rotating the cam 39 about its axis 38 and shearing off the shear pin 46. In the process, the blocking detent 41 is released from its resting surface 45 within the recess 44 of the flying body structure 27.

As a consequence, the positive connection between the guide claw 20 and the flying body 4 in the −X direction toward the flying body tail is eliminated. As regards the subsequently described separation process of the claws 20 from the flying body 4, a connection presently remains only in the friction between the center bolt 24 fixed to the flying body and the projection 32 of the guide claws 20 with their surfaces 23 on the resting surface 23' of the flying body structure 27. The guide claws 20 are simultaneously braked by the braking system 50 through the intermediary of the spring-loaded braking rail 53 as regards the motion with respect to the launch 2, whereby on one hand the friction is overcome and a separation of the claws 20 from the flying body 4 in the −X direction toward the flying body tail takes place, and on the other hand a delay approaching null in the motion of the claws 20 is effected. The continuing thrust on the flying body 4 is only insignificantly affected. The claws 20 therefore remain in the guide rail 10 at the launch 2. In this process, the center bolt 24, which is fixed to the flying body 4, has left the recess 28, which is open in the +X direction of the flight, of the claws 20. Thereafter the center bolt 24 is pulled by the compression spring 24 and by its collar 31 into a corresponding clearance 31' of the flying body structure 27 so as to be flush with the surface thereof. During the further launch phase, the flying body 4 will be guided by the remaining guide claws at the guide rail 10.

Thereafter, the remaining claws 20 will release in the same manner as described before, beginning with the front-most and ending with the rear-most.

It will be obvious to those skilled in the art that many modifications may be made within the scope of the present invention without departing from the spirit thereof, and the invention includes all such modifications.

I claim:

1. In a launch for carrying and launching flying bodies, in particular for aircraft, with guide devices in the form of guide rails and guide claws engaging said rails and bearing the flying body, the improvement comprising (a) means whereby the guide claws can be adjusted together with the flying body relative to the aircraft-fixed launch in the direction of flight within the guide rails and also relative to the flying body they carry in the direction of the flying body tail, (b) detachable, positive connection means and frictional connection means between the guide claws and the flying body, and (c) braking means for the guide claws at the launch.

2. A launch according to claim 1, in which the positive connection between the claws and the flying body comprises locking engaging means adapted to be actuated in an unlocking manner by switch detents at the claws and switch projections fixed to the rails and mounted to the launch.

3. A launch according to claim 1, in which the braking means comprises brake rails which act on the guide claws with a predetermined compression.

4. A launch according to claim 1, in which the frictional connection between the flying body and the guide claws is implemented, after unlocking the positive connection, by a center bolt, and means whereby the center bolt can be moved with respect to the claw in the direction of flight of the flying body by overcoming said frictional force.

5. A launch according to claim 4, including spring means whereby the center bolt after separation from the claw automatically moves into a clearance in the flying body so as to be flush with the contour thereof.

* * * * *

UNITED STATES PATENT AND TRADEMARK OFFICE
CERTIFICATE OF CORRECTION

PATENT NO. : 4,392,411

DATED : July 12, 1983

INVENTOR(S) : Bernd Minkler

It is certified that error appears in the above-identified patent and that said Letters Patent is hereby corrected as shown below:

ON THE TITLE PAGE:
   Item [30] has been omitted and should read as follows:

- - - Foreign Application Priority Data

May 2, 1980 [DE]   Fed. Rep. of Germany ......3016925   - - -.

Column 2, line 16, "center" should read   - - - carrier - - -.

Column 2, line 55, "and" should read   - - - end - - -.

Signed and Sealed this

Twenty-seventh Day of September 1983

[SEAL]

Attest:

GERALD J. MOSSINGHOFF

*Attesting Officer*   *Commissioner of Patents and Trademarks*